INVENTORS
FRANKLIN M. RADDIN
RICHARD J. LA MANNA
BY
ATTORNEY

Jan. 3, 1967   F. M. RADDIN ET AL   3,296,605
MAGNETIC CARD READER AND TRANSPORT
Filed Sept. 13, 1962   9 Sheets-Sheet 3
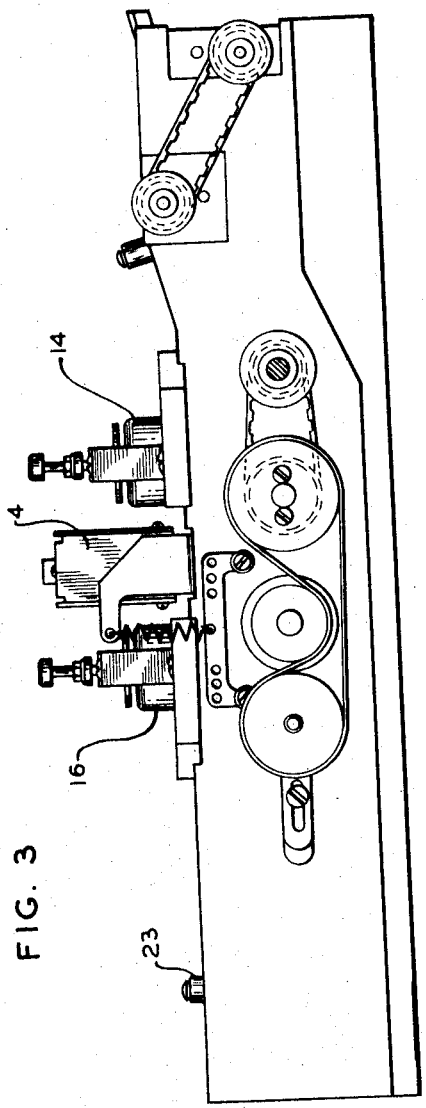
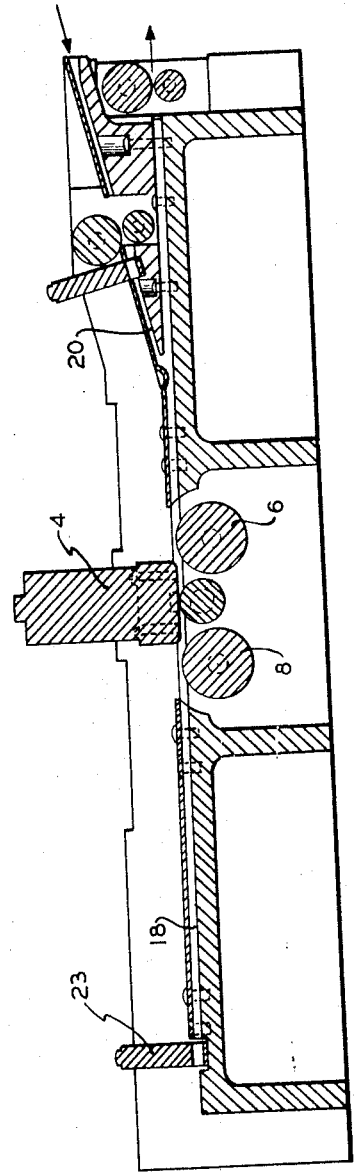
INVENTORS
FRANKLIN M. RADDIN
RICHARD J. LA MANNA
BY
ATTORNEY Jan. 3, 1967 F. M. RADDIN ET AL 3,296,605
MAGNETIC CARD READER AND TRANSPORT
Filed Sept. 13, 1962 9 Sheets-Sheet 4
FIG. 7
FIG. 8
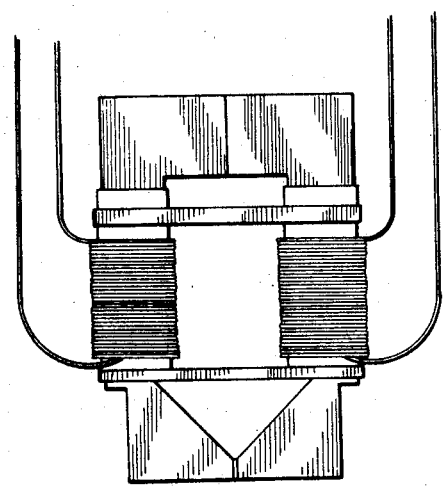
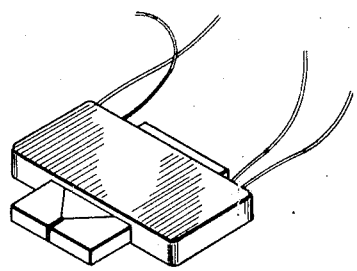
FIG. 5
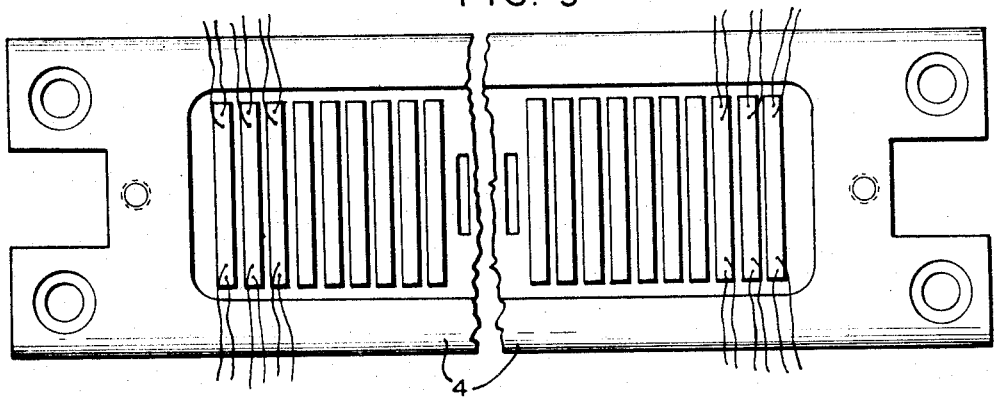
FIG. 6
FIG. 9
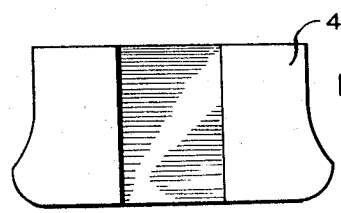
INVENTORS
FRANKLIN M. RADDIN
RICHARD J. LA MANNA
BY
ATTORNEY

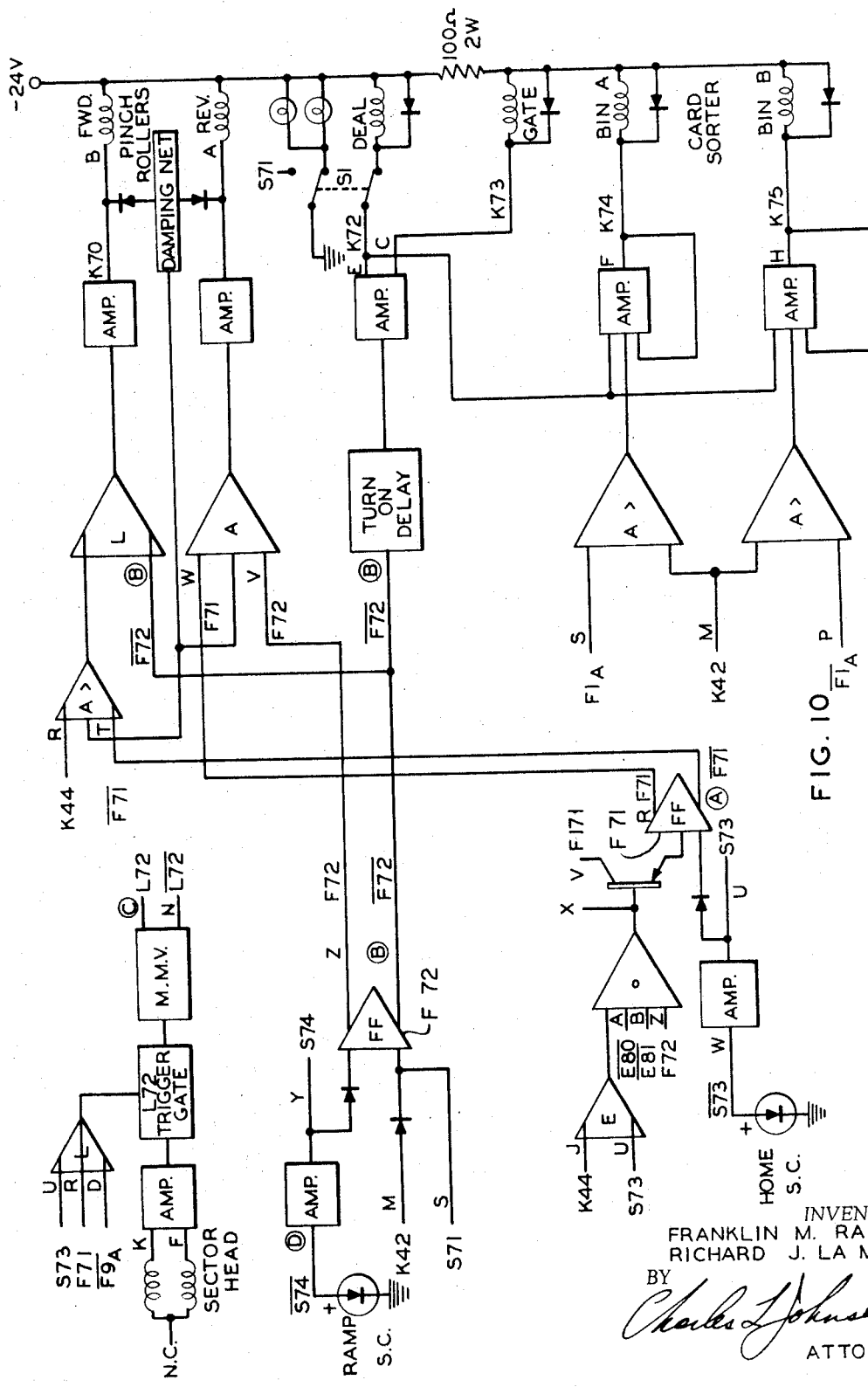

INVENTORS
FRANKLIN M. RADDIN
RICHARD J. LA MANNA
BY
ATTORNEY

Jan. 3, 1967  F. M. RADDIN ET AL  3,296,605
MAGNETIC CARD READER AND TRANSPORT
Filed Sept. 13, 1962  9 Sheets-Sheet 7

INVENTORS
FRANKLIN M. RADDIN
RICHARD J. LA MANNA
BY
Charles Johnson Jr.
ATTORNEY Jan. 3, 1967    F. M. RADDIN ET AL    3,296,605
MAGNETIC CARD READER AND TRANSPORT
Filed Sept. 13, 1962    9 Sheets-Sheet 8
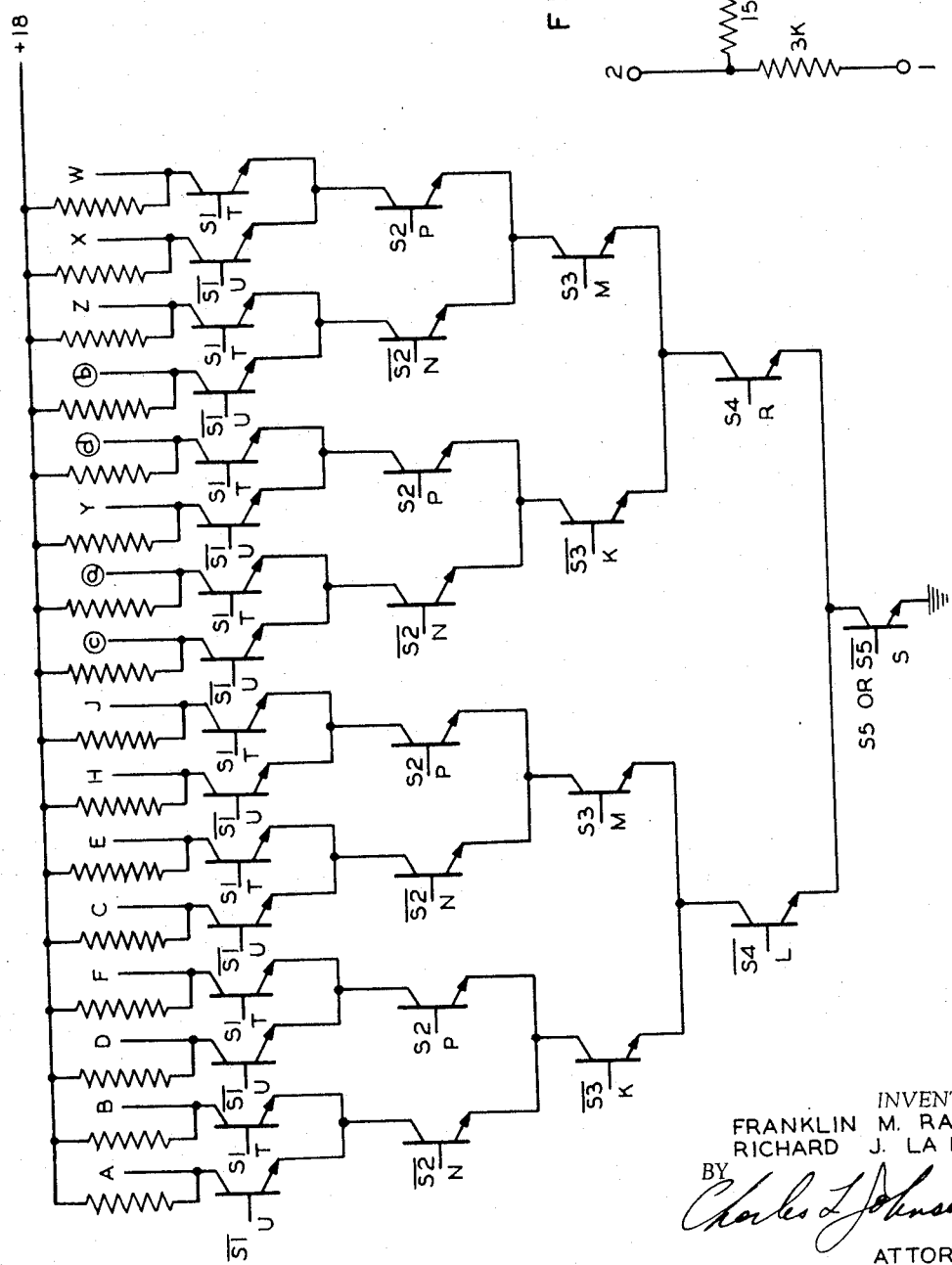
INVENTORS
FRANKLIN M. RADDIN
RICHARD J. LA MANNA
BY Charles L. Johnson Jr.
ATTORNEY

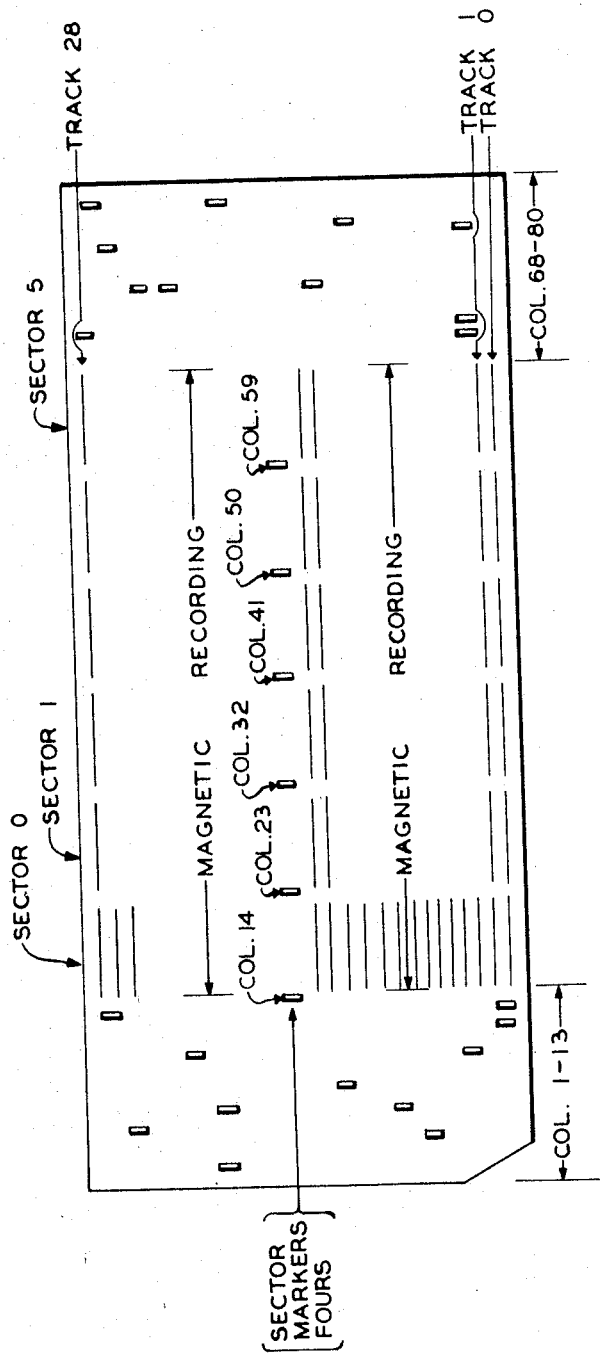

United States Patent Office 3,296,605
Patented Jan. 3, 1967

3,296,605
MAGNETIC CARD READER AND TRANSPORT
Franklin M. Raddin, Morristown, and Richard J. La Manna, Whippany, N.J., assignors to Monroe Calculating Machine Company, Orange, N.J., a corporation of Delaware
Filed Sept. 13, 1962, Ser. No. 223,362
8 Claims. (Cl. 340—174.1)

This invention relates generally to information storage and more particularly to apparatus for the handling of magnetic record cards for the recording and playback of information from the cards.

In the handling of some types of information it is desirable to have apparatus which is capable of recording on and reading from individual record cards without replacement of the original record card. The apparatus for providing these functions upon a record card should ideally provide error free operation at an acceptable speed and for a minimum expense. It is therefore a principal object of this invention to provide improved apparatus for transporting and selectively positioning record cards with respect to a magnetic transducing means.

It is another object of the invention to provide improved apparatus for recording information on and reading information from magnetic record cards.

It is a further object of the invention to provide improved transport apparatus for handling record cards.

A further object of the invention is the provision of improved magnetic transducing means for use with magnetic card record cards.

In general terms the invention comprises apparatus whereby magnetic record cards are individually transported and selectively positioned relative to magnetic transducing means whereby information in the form of magnetized spots is read from and recorded on the magnetic cards.

One novel feature of the invention relates to the use of pinch rollers and phototubes, along with associated circuits, for controlling the movement of the magnetic record cards relative to the magnetic transducing means.

Another novel feature of the invention relates to the use of flat rather than arcuate magnetic transducing heads to assure recording consistency.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

FIG. 3 is a side view of the card transport taken along the left side of the transport bed 18, omitting certain elements for clarity.

FIG. 4 is a cross-sectional view of the card transport taken along lines 4—4 of FIG. 2.

FIG. 5 is a top view of the read-write head bank.

FIG. 6 is a front elevation of the read-write head bank, with a fragmentarily broken section to show the arrangement of the individual read-write heads within the bank.

FIG. 7 is an elevation view of one of the read-write heads.

FIG. 8 is a perspective view of an encapsulated read-write head.

FIG. 9 is an end view of the read-write head bank.

FIG. 10 is a block diagram of the magnetic card transport control circuit.

FIG. 14 is a schematic representation of a voltage divider.

FIG. 15 is a schematic of one-half of the pyramid head selection circuit.

FIG. 16 is a representation of a magnetic card.

The preferred embodiment of this invention provides apparatus for individually inserting magnetic record cards into a transport where movement of the record cards and switching of magnetic heads control the automatic recording and playback of information from the record card, after which the card is automatically ejected from the transport and another record card inserted.

In the following detailed description of the apparatus by which the objects of the invention are realized, it may be seen that a magnetic record card storage system has been devised which permits more information to be stored on the surface of a standard sized record card than is possible with conventional punching techniques. The system utilizes standar size record cards which have been coated with a magnetic surface. It is this magnetic surface which acts as the storage medium.

This invention concerns apparatus for providing apparatus for transporting and selectively positioning magnetic record cards with respect to a read-write bank which, when used in conjunction with computing apparatus provides a versatile storage arrangement for the computer output information.

Figure 1:
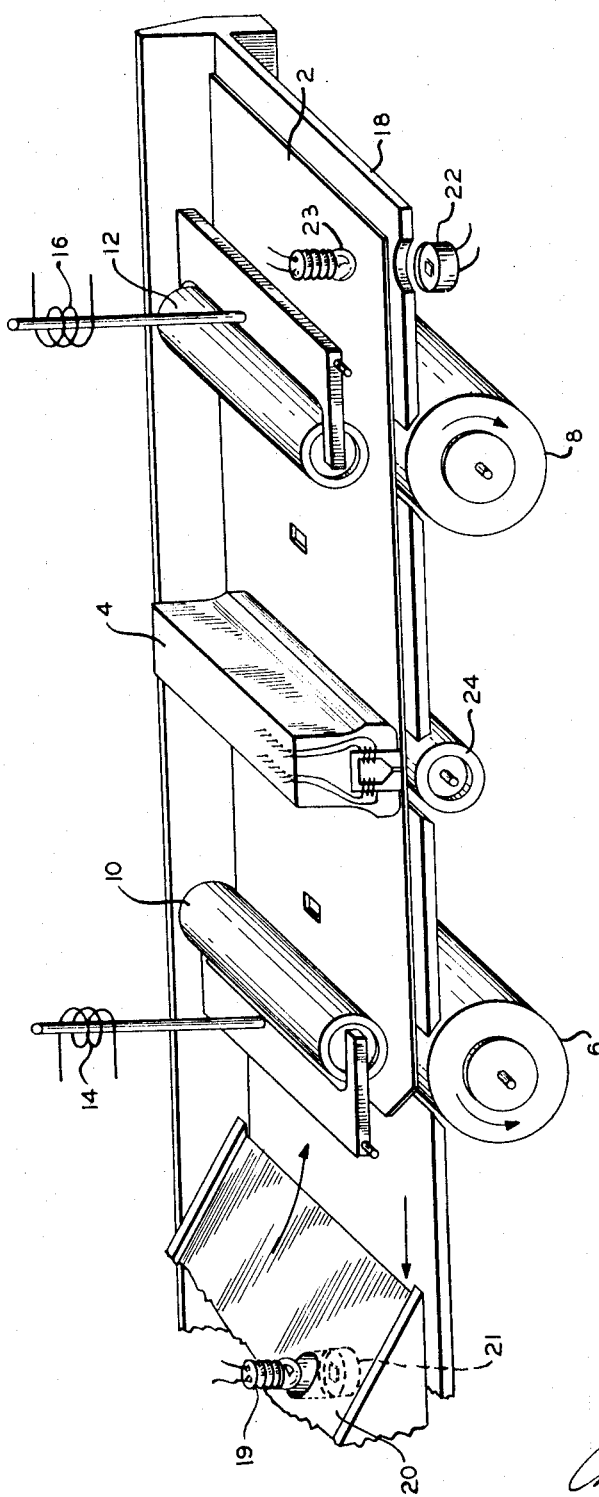
FIG. 1 is a perspective representation of the record card transport.
Figure 2:
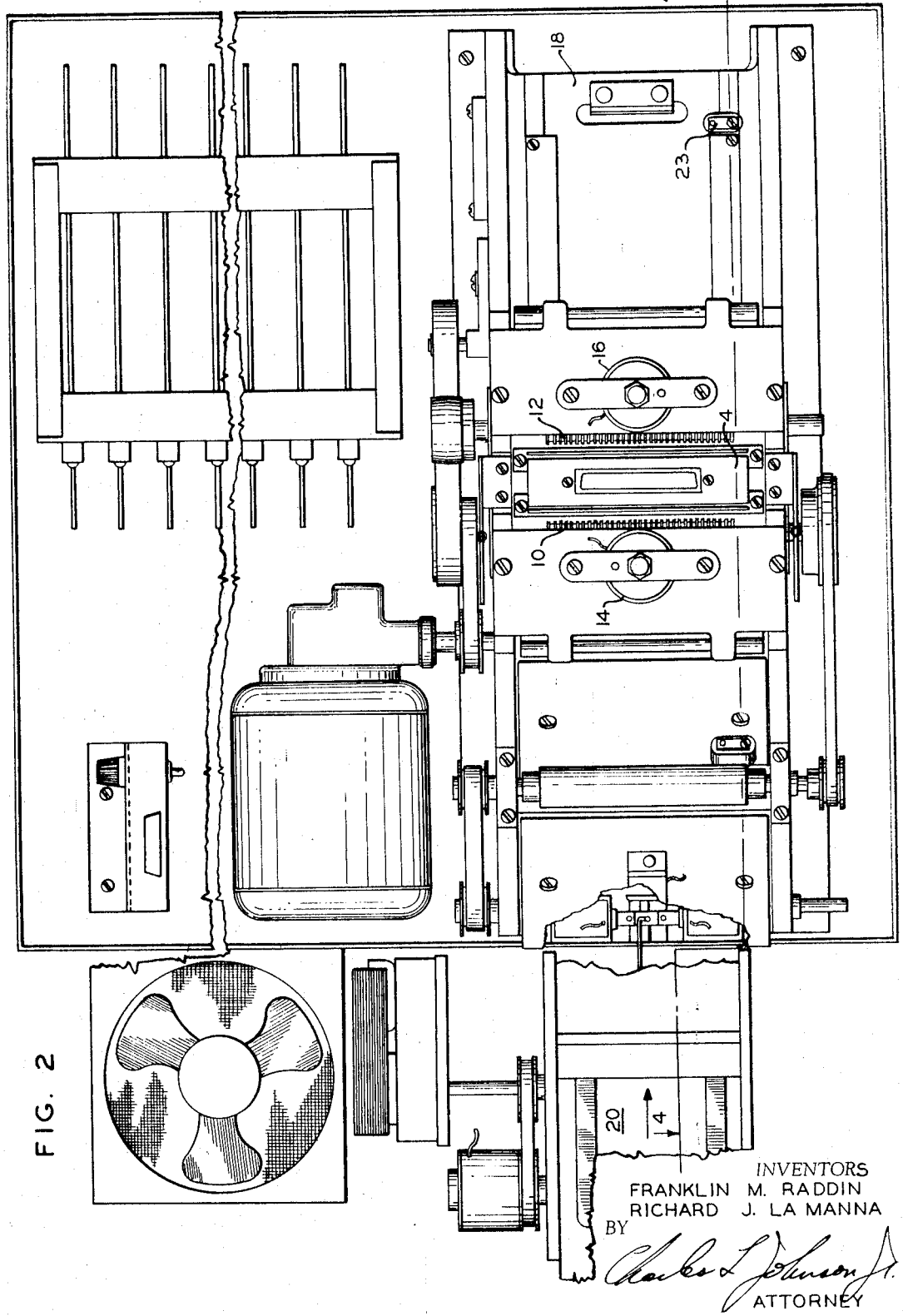
FIG. 2 is a top view of the card reader and transport.

The basic record card transport may be seen by reference to FIG. 1 showing the preferred embodiment (with the elements somewhat expanded for the sake of clarity) where the magnetic record card 2 is transported in a reciprocating fashion in contact with a head bank 4 containing 29 ring type magnetic read-write heads. The drive source for card movement is supplied by a pair of counter rotating drive rollers 6 and 8. The record card is friction driven by one or the other of the rollers 6 or 8 when an associated pinch roller 10 or 12 is operated through a solenoid 14 or 16. The record card can thus be driven forward, reverse or will remain stationary if neither pinch roller is actuated. The record card is supported on a fixed platform 18 called the bed. Apertures in the bed allow contact with the drive rollers 6 and 8.

Record cards 2 enter and exit the transport from the same end of the bed 18. The record card supply and entrance ramp 20 are elevated over the bed 18 and the exit route is under the entrance ramp 20.

Record cards 2 may be ejected under computer control or by a manual eject switch at any time and may be selectively placed in one of two output bins under computer control.

A solenoid operated clutch (not shown) serves to "deal" a record card from the bottom of the supply stack (not shown) and down the entrance ramp 20 passing between the light source 19 and a ramp photocell 21. The "deal" solenoid is operated automatically following an eject command, i.e., "deal" is involuntary and the apparatus of the system will insist on maintaining a record card 2 in the transport unless prevented by operation of a manual switch provided for that purpose.

A second solenoid (not shown) is operated simultaneously with the "deal" clutch. This solenoid is used to remove a pin (not shown) which blocks the entrance ramp 20 except when the clutch is operated. The pin blocking the entrance ramp 20 prevents manual force feeding of record cards into the bed.

The end of the bed 18 opposite the entrance ramp 20 is called the "home" position from which all read and write operations commence. When in the home position the record card interrupts a light source 23 to a home photocell 22, thereby signifying the record card is home and end of travel in that, the reverse, direction. The reading or writing is done as the record card travels in the direction away from home, forward, and is returned home when the operation is complete unless an eject command is provided.

A pressure roller 24 contacts the under surface of the record card directly beneath the head bank 4 and serves to maintain head to record card contact.

The head bank 4 (note FIGS. 5, 6 and 9) is made up of 29 ring type, ferrite core read-write heads (note FIG. 7), representing the 28 channels of information and one marker or sector channel. Only one head is in use at any one time in the preferred embodiment and simultaneous read and write does not occur. The track width on the surface of the magnetic record card 2 is normally .040″ with a .001″ head gap length. The windings in the preferred embodiment as illustrated in FIG. 7 are 1,000 turns of #44 wire, center tapped. A 29th record head is located near the center of the record card 2 width and is used exclusively with the marker or sector channel for reading marker or sector pulses which signify the beginning of each word on a track. FIG. 8 illustrates the record head after the windings, as shown in FIG. 7, have been encapsulated. FIGS. 5, 6, and 9 show the preferred arrangement of record heads within the head bank 4 and illustrate particularly the flat configuration of the head bank 4 near the air gap which records on and reads from the magnetic record card. Unlike the arcuate configuration of read-write heads utilized in reading from and recording on magnetic tapes this invention includes apparatus conforming to the discovery that a most efficient recording operation is realized from the utilization of a read-write head configuration such as to present a flat surface to the magnetic record card near the air gap portion of the read-write core. The record medium, the record card, tends to maintain a flat configuration during read and write operation and therefore a flattened read-write head bank 4 provides the greatest accuracy of recording without missing any information. The discovery of this arrangement, being contrary to conventional tape recording apparatus is one important aspect of the invention.

The record card 2 (see FIG. 16) is of standard punched card stock 3¼″ x 7⅜″ x .007″ with an iron oxide coating on one face .001″ thick.

There are 29 magnetic tracks running lengthwise on the card containing 6 words each. Each word being located in a separate one of the six sectors in each track. The words are 66 bits long with 34 bits of these bits reserved for redundancy checking. The bit density is 100 bits per inch on a track and the tracks are spaced on .1″ centers.

There are 13 standard punching columns at each end of the record card 2 which may be used for identification and sorting. The number of punching columns may of course be increased by reducing the number of magnetic sectors used.

There are apertures punched in all cards in columns 14, 23, 32, 41, 50 and 59 at the position that would normally be occupied by the four row of a standard punched record card. These 6 holes are used to identify the start of words on the magnetic tracks and are read magnetically by the sector head. Information may also be printed on the record card ends.

FIG. 10 is a schematic diagram of the electronics of the magnetic record card transport. Additional details of the electronic circuitry of the record card transport and associated record card processor are found. In co-pending application Serial No. 223,361, filed September 13, 1962 in the name of Alan K. Jensen, entitled Magnetic Card System, assigned to the assignee of the present invention and incorporated herein by reference.

The two flip-flops F71 and F72 are utilized to control record card 2 movement in the transport. Decoding of these flip-flop conditions and subsequent operation of appropriate solenoids is accomplished by five solenoid drive circuits labeled forward, reverse, deal, gate and sort. Two photocells 21 and 22 and amplifiers are also used in controlling record card movement. These are the home cell 22 creating signal S73 and the ramp cell 21 creating S74.

Operation of the record card control circuit can best be understood through an example of ejecting a record card and obtaining a new one.

One of two eject signals can be supplied to reset the flip-flop F72. A K42 computer eject command signal may be supplied by the computer (not shown) or the S71 signal supplied from the manual eject switch (shown in the right of the figure, as switch S1). Either signal arriving at the input to flip-flop F72 sets the $\overline{F72}$ side high (high=0 volt) placing 0 volt on the line designated $\overline{F72}$, and the F72 side low (low=—6.0 volts) placing —6 volts on the line designated F72. Regardless of other input conditions, when $\overline{F72}$ is high a record card will be driven forward and out of the record card transport under the ramp 20. Eject is therefore unconditional. It will be assumed that the computer eject command signal K42 is supplied for this example. Simultaneously, signal K42 operates one of the two solenoid drivers (shown in the lower right corner of the figure as well as in FIG. 13) to operate a deflector (not shown) placing the ejected record card into bin A or B (not shown) dependent upon the state of a flip-flop F1 located in the associated computer and not shown. Since the computer eject command K42 is very short in duration compared to the time necessary to operate the deflector, the two driver circuits are made regenerative to provide continued drive to the deflector.

After a delay sufficient for the ejected record card to clear the bed 18, the signal $\overline{F72}$ will operate the deal clutch and send a new record card down the ramp 20. Simultaneous with operation of the clutch the same drive circuit operates a GATE solenoid to remove a pin (not shown) normally blocking the entrance ramp 20.

The operation of the manual eject switch S1 opens a mechanically common switch blade interrupting the connection to the deal clutch and thereby providing means for preventing the automatic deal. Switch S1 is a two-position pushbutton switch and may be left in the position with the upper blade of switch S1 contacting contact S71. Indicating lamps associated with the pushbutton switch S1 will be ON in the normal operate position, when the unit is allowed to receive an additional record card.

When the delayed signal K72 appears at the output of the deal drive circuit, the signal serves to reset whichever of the flip-flops selecting the bin had been set. The deflector (not shown) itself is also bistable and when driven to either position will remain there without further drive. The two deflector drive circuits are merely acting as pulse stretchers to maintain the outputs of the flip-flop F1, located in the associated computer, during the time signal K42 was received. Actually, the ejected record card may not have yet reached the deflector when the deflector drive is removed, making mechanical memory of the last deflector selection essential.

In the event of a manual eject caused by the manual eject switch S1, the deflector is not operated (due to the absence of the K42 signal) and the record card will go into the last selected bin.

Continuing the sequence of events and assuming the manual switch S1 to be in the normal deal position, the next record card will travel down the ramp 20 and the next electronic change occurs when the record card interrupts the light from light source 19 to the ramp photocell 21 on the ramp 20, creating signal S74. Interrupting the light causes S74 to go high which in turn sets flip-flop F72 so that the signal on output line F72 is high while the signal on output line $\overline{F72}$ is low, together signifying that the next record card has moved down the ramp 20 and entering the bed 18.

Flip-flop F71 is set to the condition where output line F71 is high, due to the F72 input on the F71 set logic. The diodes of the set logic perform negative AND function so that with F72 high, it will provide a low output on pin X. This output is fed to the base of the trigger transistor at F71. The transistor thus acts as an emitter following pulling $\overline{F71}$ low. An output is also taken from the collector of this transistor and is used in error detection (not shown). F71 is set whenever an eject occurs due to the F72 input.

The combination of flip-flops F71 and F72 outputs provides drive for the reverse solenoid pinch roller 8 and also removes drive from the forward, and deal solenoids.

The record card will thus travel in the reverse direction toward the home position until the light from the light source 23 to the home photocell 22 is interrupted causing the signal S73 to go high. Signal S73 going high will reset the flip-flop F71 low, by pulling $\overline{F71}$ high, stopping the reverse drive. This completes the eject and deal cycle. The condition now is that the signals are as follows $\overline{F71}$, S73, and F72 high. This may be thought of as the ready condition from which all read and write operations must commence. Even if the K44 signal, read or write, is high when the next record card is traveling in, the ready condition can not be reached until the record card reaches the home position.

To commence a read or write operation the K44 signal, supplied by the computer (not shown) will go high and if the ready condition exists, the forward drive solenoid 14 will be operated. The record card will travel forward so long as the K44 signal is high and during the travel the read or write operation will take place in the proper record card location, as will be specified by an address technique to be described below. As soon as the reading or writing is complete the computer will allow the K44 signal to return low removing the forward drive.

During its forward travel the record card uncovers the home photocell 22 allowing the signal S73 to go low. At this point, the F71 set logic provides a low to the trigger transistor F71 due to the signal K44 and signal S73 both being low. F71 therefore gets set and reapplies the reverse drive transporting the record card toward the home position. As soon as signal S73 reappears high and flip-flop F71 will get reset with $\overline{F71}$ high and the ready condition exists once more. Note here that the K44 signal may be returned high before the record card arrives at the home position in preparation for the next read or write cycle.

Figure 11A:
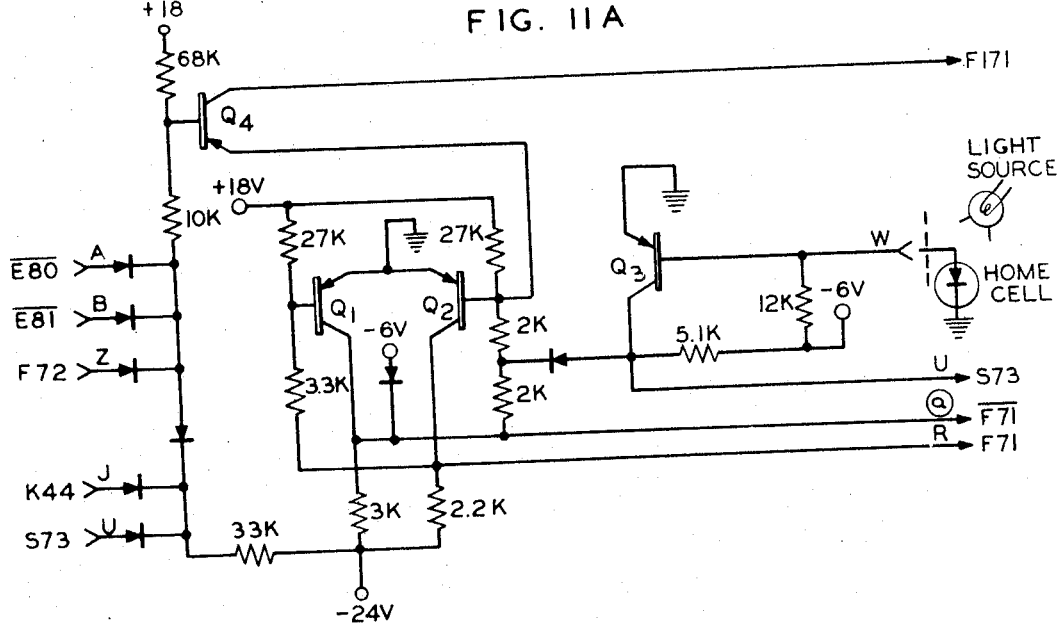
FIG. 11A is a schematic diagram of the F71 flip-flop and a photocell amplifier.

FIG. 11A is a schematic diagram of the F71 flip-flop and the photocell amplifier providing the home signal S73.

The flip-flop F71 made up of transistors $Q_1$ and $Q_2$ is a common resistance coupled circuit with no provision for fast turnover. That is, no speed-up capacitors or antisaturation techniques are required since turnover times of several microseconds are more than satisfactory.

The coupling resistor on one side of the flip-flop, leading to the transistor $Q_2$ base, is divided in order to supply an appropriate point for D.C. triggering by the signal S73. Only the output line $\overline{F71}$ is supplied with a clamp diode since output line F71 receives clamping at one of the loads it drives.

Flip-flop F71 is set whenever the input to the base of transistor $Q_4$ moves below D.C. ground. Transistor $Q_4$ acts as an emitter follower to provide triggering from high impedance logic and pulls the base of transistor negative forcing it on and transistor off through the flip-flop feed back connection. The logic from which the triggers for flip-flop are derived is a negative AND-OR connection to provide the function already described. The input to transistor is shifted positive by the divider in order to guarantee transistor off under the no signal condition. The collector of transistor is not returned directly to a power supply as in the case of most emitter follower circuits. The impedance of the collector circuit is low enough to provide the required follower function for flip-flop F71.

Transistor $Q_3$ provides amplification of the input from the photocell 22 located at the home position of the record card bed 18 and thereby creates the signal S73. The photocell 22 is essentially a current source which, when illuminated (indicating the absence of a record card 2 at the home position) will supply all the current drawn by the path including the 12K base resistor. Transistor $Q_3$ is held off due to lack of base drive and signal S73 is low, approximately —6 volts. When the home photocell 22 is covered (indicating a record card 2 at the home position), the photocell 22 current drops to near zero and the 12K resistor is forced to pull current from the base of transistor $Q_3$. Transistor $Q_3$ turns on and the signal S73 at its collector rises to near ground. As a result, the midpoint of the base drive divider for transistor $Q_2$ is moved to near ground and current through the 27K base bias resistor forces transistor $Q_2$ off and the flip-flop F71 is reset, with the output line $\overline{F71}$ returned to a high value, or 0 volt. The collector load resistor of transistor $Q_3$ is returned to —6 volts to avoid the need for a clamp diode and as a result, the lower level of signal S73 may vary slightly with loading.

The photocells 21 and 22 are Hoffman type 58C silicon solar cells and the light sources 19 and 23 are Tung Sol #4 readout lamps.

Design and operation of the S74 amplifier is identical to S73.

Figure 12:
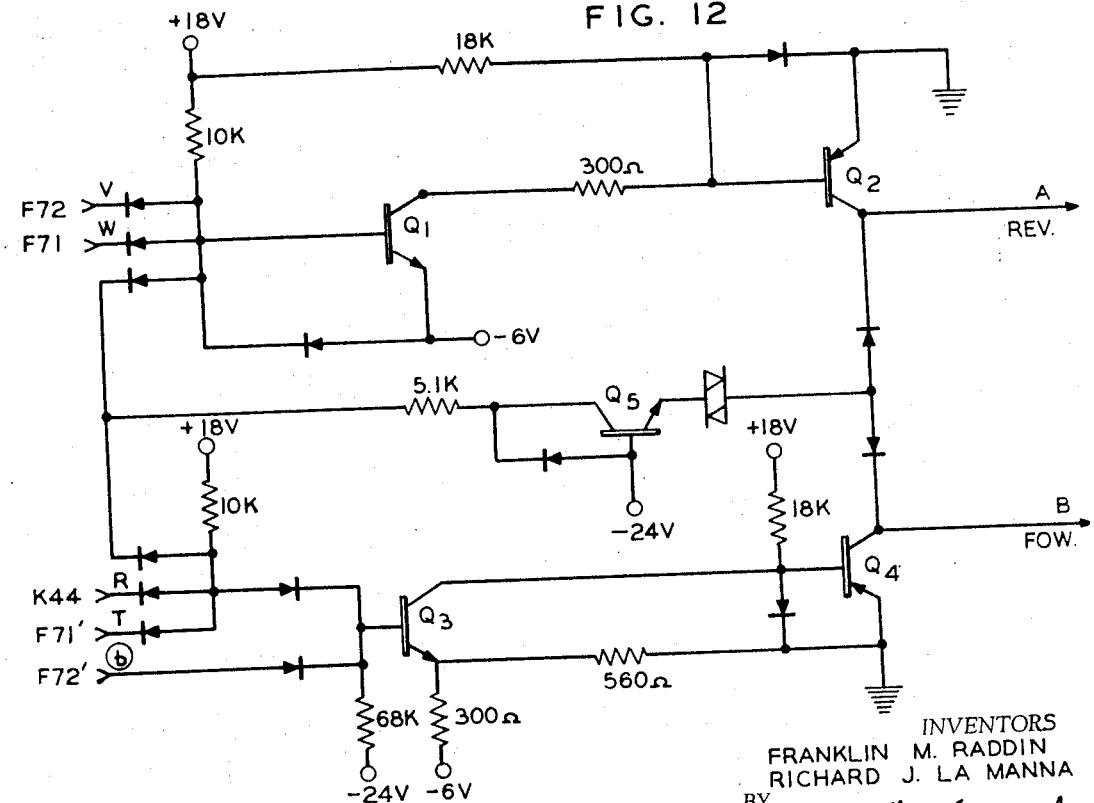
FIG. 12 is a schematic of the solenoid drive circuits which actuate the pinch rollers for forward and reverse card motion.

FIG. 12 is a schematic of the solenoid drive circuits which actuate the pinch rollers 10 and 12 for forward and reverse record card motion.

Transistors $Q_1$ and $Q_2$ form the drive amplifier for the reverse pinch roller 12. The diode connected from emitter to base of the transistor $Q_1$ serves to clamp both signals F71 and F72. This has advantage other than the saving of one diode. It assures off bias for transistor $Q_1$ when either signal is low without the use of voltage dividers. That is, if either input is low there is forward current through the diode. Both transistors $Q_1$ and $Q_2$ are ON simultaneously if both inputs are high. The 300 ohm resistor provides current limiting and the diode formed by the base to emitter of transistor $Q_2$ provides $V_{cb}$ limiting.

Transistors $Q_3$ and $Q_4$ form a similar amplifier for the forward drive solenoid 14 with the following differences. In this case the input logic is two levels and the first level is made to supply enough excess current for base drive to transistor $Q_3$. OFF biasing of transistor $Q_3$ as well as current limiting is supplied by the 560 and 300 ohm divider in the emitter circuit.

It is possible for logical conditions on the amplifier inputs to be altered calling for a change in record card direction in approximately one microsecond. Since the inductive kick occurring on the solenoid release must be damped, it is probable that the new direction solenoid will be energized before the previously operated solenoid has released. This would result in simultaneous forward and reverse drive being applied and objectionable wear to pinch rollers 10 and 12 and to the record card surface. To prevent this occurrence, the damping current for either solenoid is routed via the associated damping diode through the damping varistor and the transistor $Q_5$. Transistor $Q_5$ will be on whenever there is damping current in either solenoid. A resistor is connected from the collector of transistor $Q_5$ to a diode in the AND input of each amplifier. Whenever, transistor $Q_5$ is on, due to damping current, the input of both drivers is held low preventing further drive. The overall result is that, before either solenoid can be operated, the other solenoid must be dropped out. When the damping current falls below the level required to hold the inputs low, approximately 3.0 m., it is assumed that the solenoid has dropped out.

The initial damping current extracted from the emitter of transistor $Q_5$ is on the order of 200 ma. Most of this current flows from the −24 volt supply, through high conductance diode connected to the collector of transistor $Q_5$, and the collector-emitter diode of transistor $Q_5$. This is true because the impedance of this path is much lower than the base resistance of transistor $Q_5$. If the high conductance diode were removed, the circuit would continue to operate satisfactorily but with the bulk of the current now flowing base to emitter. The only ill effect would be the high power peaks in the base resistance and shorter transistor life.

The nonlinear resistance of the varistor in the damping network is used to provide optimization of drop out time and transistor voltage rating. The reduced drop out time saves overall time of a complete read or write operation and in addition minimizes the wasted space at the end of the card.

Figure 13:
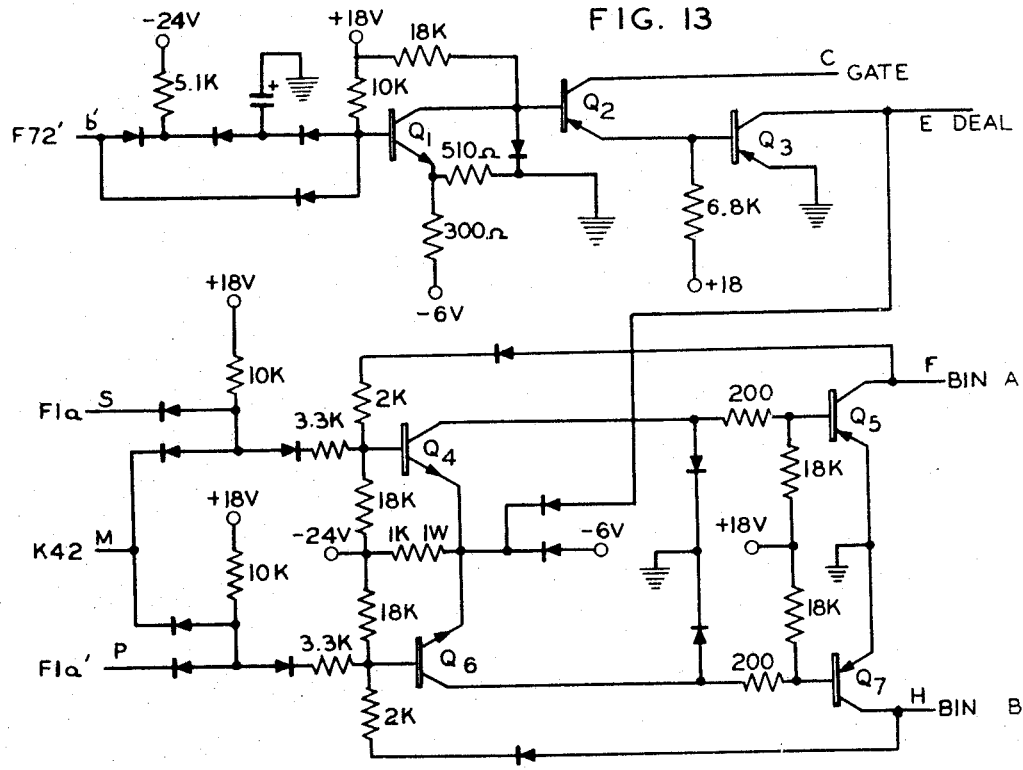
FIG. 13 is a schematic of the solenoid drivers for operation of the deal, ramp gate and output bin selector solenoids.
Figure 11B:
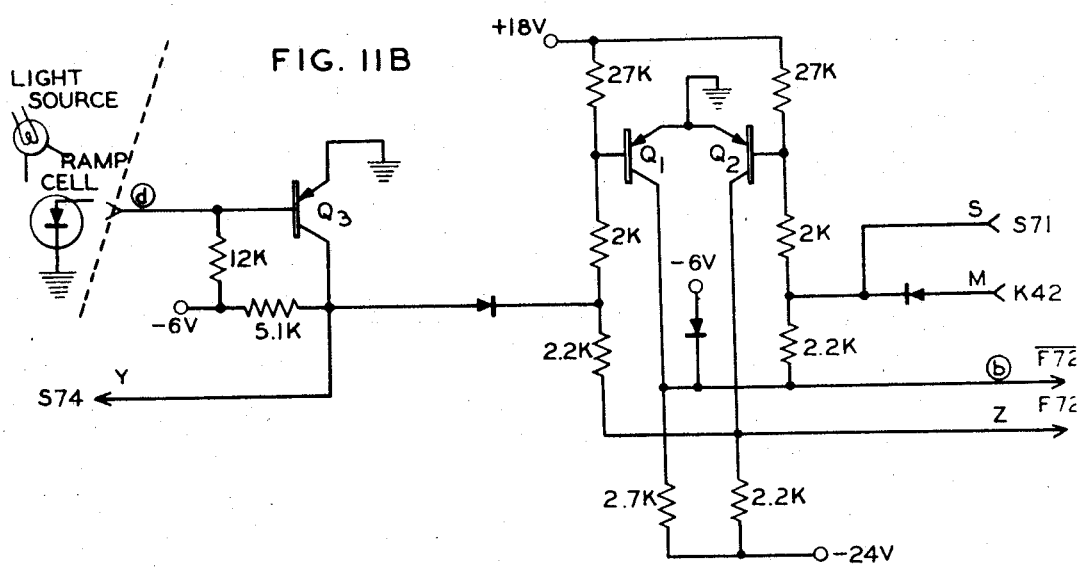
FIG. 11B is a schematic of the F72 flip-flop and the ramp photocell amplifier S74.

In FIG. 13 are shown the schematics of the solenoid drivers for operation of the deal, ramp gate and output bin selector solenoids.

Transistors $Q_1$, $Q_2$, and $Q_3$ form the driver for the ramp gate and deal solenoids. The network leading up to the base of transistor $Q_1$ serves to delay the rise of signal $\overline{F72}$ as viewed by transistor $Q_1$ without delaying the fall. The circuit provides the added requirement of isolating signal $\overline{F72}$ from the capacitive load. The delay in operating the deal solenoid is approximately .25 second. Recalling the logical operation, this delay is to allow the ejected record card to clear the bed 18 before injecting the next record card. Actually, the delay is such that the next record card is in the input ramp 20 before the ejected record card actually clears the bed 18 and the record card exist on and under the ramp 20 simultaneously. The delay is not acceptable in turning the deal solenoid off in order to prevent partial advance of the next record card in the input hopper (not shown).

The biasing and operation of transistor $Q_1$ is identical to transistor $Q_1$ in the forward solenoid drive circuit. The emitter of transistor $Q_2$, however, is returned to ground through the base of transistor $Q_3$. The transistor $Q_2$ collector drives the gate solenoid and transistor $Q_3$ the deal clutch. The collector current of transistor $Q_2$ becomes base drive for transistor $Q_3$. Since three transistors are needed for sufficient gain to drive both solenoids, the transistor $Q_2$–$Q_3$ connection offers advantages. One is the elimination of a relatively high power resistor dissipating uselessly in the transistor $Q_2$ collector circuit. A second is that the clutch will not be operated under most conditions of failure to open the gate. The solenoids require separate damping diodes.

Transistors $Q_4$ and $Q_5$ form a regenerative amplifier for driving the output deflector to the bin A position and transistors $Q_6$ and $Q_7$ do likewise for bin B.

The operation of the two amplifiers is similar to those described above except as follows. A feedback connection is made in each amplifier from the output transistor back to the input base thereby supplying the flip-flop action. The emitters of the input transistors are made to share a current source which provide a common reset point. Assume a record card is to be ejected into bin A. At the appearance of the computer eject command signal K42 and the setting of the computer flip-flop F1 so that its output line F1 is high a positive input current will be provided to transistor $Q_4$. The 3.3 K. and 18.0 K. resistive divider on the base of transistor $Q_4$ will pull the base more positive than the emitter, which had been clamped to near −6.0 volts. Transistor $Q_4$ and therefore transistor $Q_5$ turn on and the feedback network establishes additional base drive back to transistor $Q_4$. At this point the signals K42 and the F1 output line of flip-flop F1 are free to return low and the computer may go on with other activities. The drive to the bin A solenoid continues while transistor $Q_4$ becomes saturated with an emitter potential of approximately −3.5 volts. Some time later, the delayed drive to the deal solenoid will appear and that output is coupled to emitter of transistor $Q_4$ raising it to near ground. The divider action supplied by the 2.0 K. and 18 K. base resistors will yield transistor $Q_4$ off thereby resetting the bin A amplifier. When the drive to the deal solenoid is stopped, the emitters of transistors $Q_4$ and $Q_6$ will return to approximately −6.0 volts awaiting the next appearance of the computer eject command signal K42. Note that, at the appearance of deal, both bin amplifiers receive the reset signal. It is obvious that the bin amplifiers could be monostable circuits. Most one-shot circuits, however, require large capacitors and/or known rise times. Since the reset signal exists in any event, the addition of the one diode to insert it seems more appropriate. The reason incidentally for resetting at all, is merely to reduce power consumption in the bin solenoids.

An address of a word stored on the record card consists of two components which define its physical location. Part one is the track address which defines the particular head under which the word will pass and the second part is the sector address which selects one of the six words which will pass under the selected head. Track refers to a group of six words along the length of the record card and sector to a group of twenty-nine words across the width of the record card.

Both the track and sector address in which an operation is to take place must be established before a K44 (read or write) command signal is given. That is, the rules for addressing demand that neither component of the address may be altered once the forward motion of the record card commences. This limitation is imposed by the method of locating the sector which will be described below. It may be concluded from the above, then, that only one word can be written or read on each forward movement of the record card.

As stated, the track address selects which of the heads will be connected to the record and playback circuits. Both the record and playback are connected across the selected head and the interior electronics of each assures it will not interfere with operation of the other. They are never in use at the same time in the preferred embodiment.

The selection is made via a direct coupled transistor pyramid (see FIG. 15) which is used to convert a five bit binary code from the computer into a "one of thirty-two" code. The pyramid provides an approximate D.C. ground potential to the center tap of the selected head winding. The center tap of all other heads is held at a positive potential. As a result, the two common lines connecting the record and playback circuits are also at approximately D.C. ground. A current source, located in the playback amplifier, provides sufficient current through the diodes, in series with the head, to bias them to a low impedance point on their forward characteristics. The positive potential at the center tap of all other heads keeps the associated series diodes biased off. The diode biasing current through the selected head is near enough equal in the two head windings to provide canceling of the flux generated at the head gap.

The playback amplifier is always in operation. That is, playback is not deliberately switched off when recording or changing tracks. The output of the amplifier is merely ignored except at time of interest and recovery to proper operation following record or selection transients is made rapidly. The design of the playback amplifier provides protection against permanent destruction by transients.

The binary coded address is supplied by five flip-flops in the computer. The ten signals, complements are included, are fed into voltage dividers providing a D.C. level shift and current limiting for driving the pyramid. A schematic of one divider is shown on FIG. 14. A schematic of one-half the pyramid is provided in FIG. 15. The complete pyramid consists of two identical circuits differing only in that signal S5 is sent to one board and $\overline{S5}$ to the other. $\overline{S5}$ is used to select heads 0 through 15. S5 selects heads 16 through 28. Referring to the pyramid schematic, FIG. 15, if head seven were to be selected, the computer code would be F1, F2, F3, $\overline{F4}$, $\overline{F5}$ and provide equivalent signals of S1, S2, S3, $\overline{S4}$ and $\overline{S5}$. These signals would be applied to the pyramid through the dividers and connect a ground through the five transistors to pin J. In all other paths, at least one transistor is off and an open circuit exists between the center taps and ground. These center taps will be pulled to $+18$ volts by the resistors shown. Note that only one divider is needed for each of the computer signals although this divider may be connected to as many as 14 transistor bases. This is true because only one transistor being driven by each signal has a complete path to ground and can draw current from the divider. This simple analysis of course ignores the effect of leakage currents which forces the divider impedance to be relatively low.

It should be noted that a total of 32 addresses are available through selection but a smaller number of heads actually exist. If the number of required heads is 16 or less one selection circuit may be removed without making any other changes.

The particular sector to be selected is set up in a counter in the computer (not shown) in complemental form. Each marker or sector pulse read by the marker or sector pulse head is fed to this counter and when the counter goes to zero, the following sector is the desired sector and reading or recording will take place in the sector so chosen, employing the track head selected, as indicated above.

It is thus seen that the apparatus shown and described fully accomplishes the objects of the invention by utilization of the many novel features.

It should be understood that this invention is not limited to specific details of construction and arrangement thereof herein illustrated and that changes and modifications may occur to one skilled in the art without departing from the spirit of the invention; the scope of the invention being set forth in the following claims.

What is claimed is:

1. Apparatus for transporting and selectively positioning record cards having a magnetizable surface thereon adjacent a magnetic transducing means comprising a record card transport bed along which said record cards are moved, said record card transport bed being flat and rigid; first rotating drive means positioned for selectively moving said record cards in a first direction; second rotating drive means positioned for selectively moving said record cards in a second direction; magnetic transducing means having an air gap positioned adjacent to and above said bed and spaced apart therefrom by substantially the thickness of said record cards; pressure means positioned in an opening in said bed, said opening being adjacent the air gap of said magnetic transducing means, said pressure means causing intimate contact between the magnetizable surface of said record cards and said magnetic transducing means and preventing unwanted spacing between said magnetizable surface of said record cards and said magnetic transducing means; said first rotating drive means, said second rotating drive means and said pressure means being spaced with respect to said bed to describe a plane parallel with said bed and said magnetic transducing means, said plane being separated from said magnetic transducing means at said air gap by substantially the thickness of said record cards; first selectively operable control means for bringing said record cards into intimate contact with said first rotating drive means to move said record cards in said first direction; second selectively operable control means for bringing said record cards into intimate contact with said second rotating drive means to move said record cards in said second direction; and control means coupled to said first and second selectively operable control means to selectively operate them in accordance with the desired position of said magnetic record card with respect to said magnetic transducing means.

2. Apparatus for transporting and selectively positioning record cards as defined in claim 15, further including; input means for introducing said record cards to said bed; output means for removing said record cards from said bed; said control means comprising a first detection means for detecting the introduction of a record card from said input means; said first detection means producing a first signal and applying it to said first selectively operable control means to operate said first selectively operable control means to prevent contact between said record cards and said first rotating drive means; said first signal also applied to said second selectively operable control means to operate said second selectively operable control means to bring said record card into intimate contact with said second rotating drive means to move said record card in said second direction toward a predetermined position along said bed, second detection means located at said predetermined position for detecting the arrival of said record card at said predetermined position and producing a second signal and applying it to said second selectively operable control means to prevent further contact between said record cards and said second rotating drive means; and signal responsive means adapted to receive signals and control said first and second selectively operable control means to move said record card to position portions of said record card with respect to said magnetic transducing means or move said record card to said output means.

3. Apparatus for transporting and selectively positioning record cards as defined in claim 2, when said first and second detection means are each light source-photocell arrangements, said first and second selectively operable control means are solenoid operated punch rollers and said magnetic transducing means has a face adjacent the magnetizable surface of said record cards which is flat and parallel with said bed.

4. Apparatus for transporting and selectively positioning record cards having a magnetizable surface thereon adapted to having information recorded thereon and having information read therefrom in distinct tracks along the width of said record cards and in distinct sectors along the length adjacent a magnetic transducing means comprising a record card transport bed along which said record cards are moved, said record card transport bed being flat and rigid; magnetic transducing means having a face flat and parallel with said bed said magnetic transducing means of said record cards positioned with said flat face adjacent to and above said bed and spaced apart therefrom by substantially the thickness of said record cards; pressure means positioned in a first opening in said bed, said first opening being adjacent the face of said magnetic transducing means, said pressure means causing intimate contact between the magnetizable surface of said record cards and the face of said magnetic transducing means and preventing unwanted spacing between said magnetizable surface of said record cards and said magnetic transducing means; first drive roller, positioned in a second opening in said bed; first drive means coupled to said first drive roller to rotate said first drive roller in a first direction; second drive roller, positioned in a third opening in said bed; said pressure means, said first and second drive rollers, each spaced with respect to said bed such that the distance between the plane parallel with and including the flat face of the magnetic transducing means and a plane tangent to the surface of said pressure means, said first and second drive rollers parallel with said bed is substantially equal to the thickness of said record card; second drive means coupled to said second drive roller to rotate said second drive roller in a second direction, opposite said first direction; said first and second drive rollers being spaced apart from one another by a first predetermined distance, said distance being sufficient to support said record cards and prevent their flexing with respect to said magnetic transducing means; first selectively operable control means for bringing said record cards into intimate contact with said first drive roller to move said record cards in a first direction; second selectively operable control means for bringing said record cards into intimate contact with said second drive roller to move said record cards in a second direction, opposite said first direction, and control means coupled to said first and second selectively operable control means to selectively operate them in accordance with the desired position of said magnetic record card with respect to said magnetic transducing means.

5. Apparatus for transporting and selectively positioning record cards as defined in claim 4, further including; input means for introducing said record cards to said bed; output means for removing said record cards from said bed; said control means comprising a first detection means for detecting the introduction of a record card from said input means; said first detection means producing a first signal and applying it to said first selectively operable control means to operate said first selectively operable control means to prevent contact between said record cards and said first drive roller; said first signal also applied to said second selectively operable control means to operate said second selectively operable control means to bring said record card into intimate contact with said second drive roller to move said record card in said second direction toward a predetermined position along said bed, second detection means located at said predetermined position for detecting the arrival of said record card at said predetermined position and producing a second signal and applying it to said second selectively operable control means to prevent further contact between said record cards and said second drive roller; and signal responsive means adapted to receive signals and control said first and second selectively operable control means to move said record card to position portions of said record card with respect to said magnetic transducing means or move said record card to said output means.

6. Apparatus for transporting and selectively positioning record cards as defined in claim 5, when said first and second detection means are each light source-photocell arrangements, and said first and second selectively operable control means are solenoid operated pinch rollers.

7. Apparatus for transporting and selectively positioning record cards as defined in claim 6 wherein said magnetic transducing means is composed of a plurality of individual magnetic transducing heads joined together to form a unit, one head for each distinct track of information to be recorded on or read from said record cards, said individual magnetic transducing heads being separated by a nonmagnetic spacer.

8. Apparatus for transporting and selectively positioning record cards as defined in claim 7 wherein said pressure means is a roller having a serrated surface, the high points of the serrations each positioned opposite an individual magnetic transducer head to insure intimate contact between the magnetizable surface of the record cards and said associated transducer head, each of the valleys in said serrated surface of said roller being positioned opposite a nonmagnetic spacer to prevent contact between the magnetizable surface of said record cards and said nonmagnetic spacers.

References Cited by the Examiner
UNITED STATES PATENTS

| | | | |
|---|---|---|---|
| 2,275,600 | 3/1942 | Bryce | 346—74 |
| 2,531,642 | 11/1950 | Potter | 340—174.1 |
| 2,916,728 | 12/1959 | Gilson | 179—100.2 |
| 2,952,008 | 9/1960 | Mitchell et al. | 235—61.114 |
| 3,039,682 | 6/1962 | Edminster et al. | 235—61.11 |
| 3,178,175 | 4/1965 | Hohmann | 271—52 |

JAMES W. MOFFITT, *Acting Primary Examiner.*

IRVING SRAGOW, *Examiner.*

V. P. CANNEY, M. K. KIRK, *Assistant Examiners.*